US012611859B2

(12) United States Patent
Awanohara et al.

(10) Patent No.: US 12,611,859 B2
(45) Date of Patent: Apr. 28, 2026

(54) PRINTING APPARATUS AND PRINTING METHOD

(71) Applicant: SEIKO EPSON CORPORATION, Tokyo (JP)

(72) Inventors: Yuki Awanohara, Matsumoto (JP); Yuki Inoue, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 159 days.

(21) Appl. No.: 18/439,977

(22) Filed: Feb. 13, 2024

(65) Prior Publication Data

US 2024/0269979 A1 Aug. 15, 2024

(30) Foreign Application Priority Data

Feb. 15, 2023 (JP) ................................ 2023-021377

(51) Int. Cl.
*B41J 2/045* (2006.01)
*B41J 2/155* (2006.01)
*B41J 11/00* (2006.01)

(52) U.S. Cl.
CPC ....... *B41J 2/04573* (2013.01); *B41J 2/04508* (2013.01); *B41J 2/04586* (2013.01); *B41J 2/04588* (2013.01); *B41J 2/155* (2013.01); *B41J 11/0085* (2013.01); *B41J 11/0095* (2013.01)

(58) Field of Classification Search
CPC ................ B41J 2/04573; B41J 2/04508; B41J 2/04586; B41J 2/04588; B41J 2/155; B41J 11/0085; B41J 11/0095; B41J 11/06
See application file for complete search history.

(56) References Cited

U.S. PATENT DOCUMENTS 9,643,437 B2 5/2017 Yanagisawa
2011/0227980 A1* 9/2011 Saitoh .................. B41J 11/0095 347/14
2017/0173947 A1* 6/2017 Ito ........................ B41J 2/04586
2022/0080727 A1* 3/2022 Okushima ............ B41J 2/04581

FOREIGN PATENT DOCUMENTS

JP 2004216652 A * 8/2004 .............. B41J 15/22
JP 2016-193561 A 11/2016

* cited by examiner

*Primary Examiner* — Thinh H Nguyen

(74) *Attorney, Agent, or Firm* — WORKMAN NYDEGGER

(57) ABSTRACT

A printing apparatus in which a support portion suctions a printing medium via a plurality of suction holes disposed in a transport direction of the printing medium, a line type printing head ejects ink onto the printing medium moved on the support portion by a transport unit, an ejection timing control unit controls ejection timing such that first ejection timing is earlier than second ejection timing, where ejection timing when a leading end of the printing medium in the transport direction is positioned in a first region of the support portion is defined as the first ejection timing, and ejection timing when the leading end is positioned in a second region of the support portion positioned downstream of the first region in the transport direction is defined as the second ejection timing.

9 Claims, 11 Drawing Sheets

PRINTING APPARATUS AND PRINTING METHOD

The present application is based on, and claims priority from JP Application Serial Number 2023-021377, filed Feb. 15, 2023, the disclosure of which is hereby incorporated by reference herein in its entirety.

BACKGROUND

1. Technical Field

The present disclosure relates to a printing apparatus and a printing method.

2. Related Art

In the related art, a technique for suppressing paper floating in which a printing medium floats from a platen is known. For example, JP 2016-193561 A discloses a technique for suppressing the paper floating by disposing a serrated roller between printing heads and pressing a printing surface with the serrated roller.

In the method disclosed in JP 2016-193561 A, since the printing surface is physically pressed, a trace of the roller is generated on the printing surface after printing. For this reason, there has been proposed a configuration in which a printing medium is suctioned by a suction platen to suppress the paper floating without using a serrated roller. However, until a leading end of the printing medium is positioned downstream of the suction platen in a transport direction of the printing medium, an area of the printing medium that covers the suction platen changes depending on a position of the leading end of the printing medium. For this reason, until the leading end of the printing medium is positioned downstream of the suction platen in the transport direction of the printing medium, resistance due to the suction by the suction platen changes, a transport speed of the printing medium changes, and a shift of a landing position of ink occurs.

SUMMARY

An aspect for solving the above-described problems is a printing apparatus including a transport unit configured to transport a printing medium, a support portion including a plurality of suction holes, and configured to support the printing medium while suctioning the printing medium via the suction hole, a line type printing head disposed at a position facing the support portion, and configured to perform printing by ejecting ink onto the printing medium supported by the support portion, and an ejection timing control unit configured to control ejection timing of the ink ejected from the line type printing head, wherein when the ejection timing when a leading end of the printing medium in a transport direction is positioned in a first region of the support portion is first ejection timing, and the ejection timing when the leading end is positioned in a second region of the support portion positioned downstream of the first region in the transport direction is second ejection timing, the ejection timing control unit controls the ejection timing such that the first ejection timing is earlier than the second ejection timing.

Another aspect for solving the above-described problems is a printing method according to a printing apparatus including a transport unit for transporting a printing medium, a support portion including a plurality of suction holes and configured to support the printing medium while suctioning the printing medium via the suction hole, and a line type printing head disposed at a position facing the support portion for performing printing by ejecting ink onto the printing medium supported by the support portion, the printing method including a suction step for suctioning the printing medium via the suction hole, an ejection step for the line type printing head to eject ink onto the printing medium, and a timing control step for controlling ejection timing at which the ink is ejected from the line type printing head, wherein when the ejection timing when a leading end of the printing medium in a transport direction is positioned in a first region of the support portion is first ejection timing, and the ejection timing when the leading end is positioned in a second region of the support portion positioned downstream of the first region in the transport direction is second ejection timing, the timing control step controls the ejection timing such that the first ejection timing is earlier than the second ejection timing.

DESCRIPTION OF EMBODIMENTS

1. First Embodiment

Below, with reference to the drawings, a printing apparatus 1 according to a first embodiment will be described.

1-1. Overall Configuration of Printing Apparatus

Figure 1:
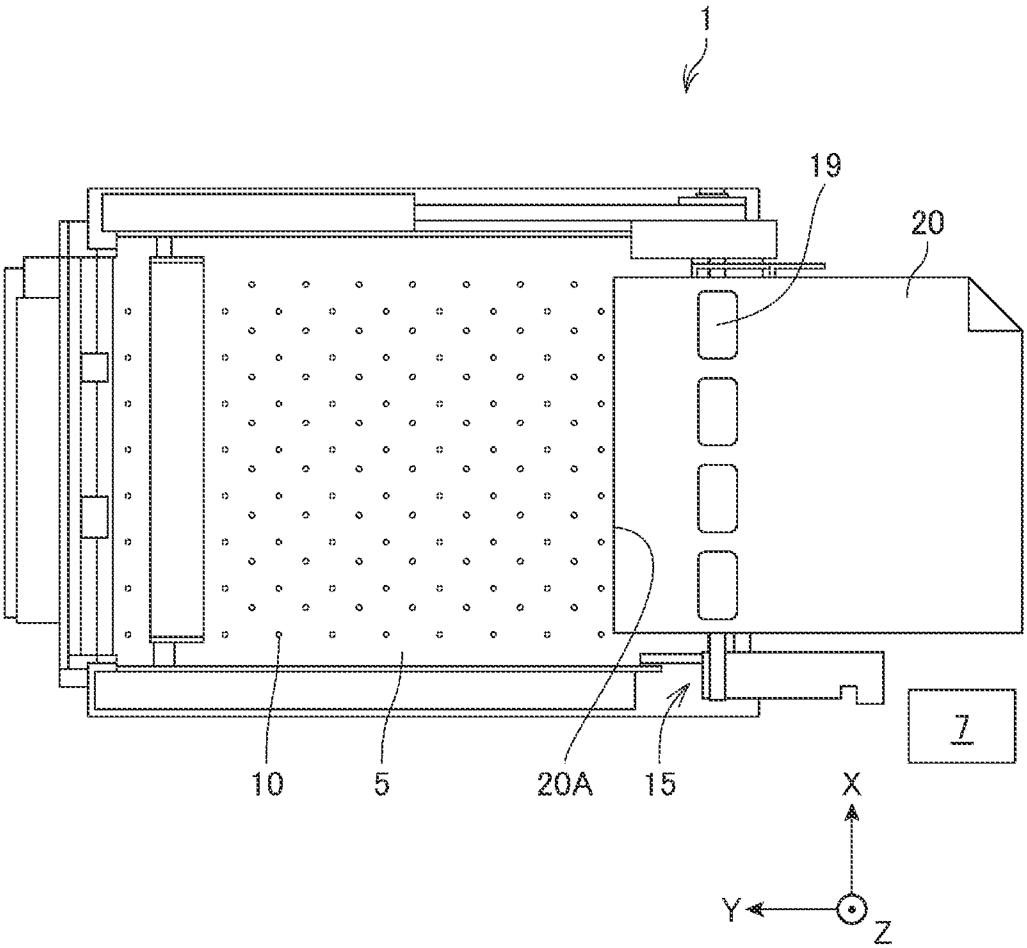
FIG. 1 is a top view schematically illustrating an inside of a printing apparatus.

FIG. 1 is a top view schematically illustrating an inside of the printing apparatus 1 according to the first embodiment.

The printing apparatus 1 illustrated in FIG. 1 is an apparatus that performs printing by ejecting ink onto a printing medium 20 placed on a support portion 5. The printing medium 20 is label paper in which a label is arranged on a mount.

In FIG. 1, an X-axis, a Y-axis, and a Z-axis are illustrated. The X-axis, the Y-axis, and the Z-axis are orthogonal to one another. The Z-axis is an axis extending in an up-down direction, and can also be referred to as an axis extending in a vertical direction. The X-axis and the Y-axis are parallel to a horizontal plane. In the following description, a direction along the X-axis is referred to as a left-right direction, and a direction along the Y-axis is referred to as a front-rear direction.

The printing apparatus 1 includes the support portion 5 that supports the printing medium 20. The support portion 5 is a table that does not move in the front-rear direction and the left-right direction. The support portion 5 supports the printing medium 20 on a flat upper surface. A plurality of suction holes 10 for adsorbing the printing medium 20 by suction are provided in a matrix on the upper surface of the support portion 5. The support portion 5 is also commonly referred to as a suction platen.

The printing apparatus 1 includes a transport unit 15 for transporting the printing medium 20. The transport unit 15 includes a plurality of rollers 19 that sandwich the printing medium 20 from above and below in the Z-axis direction, and transports the printing medium 20 on the support portion 5 in a positive direction of the Y-axis (downstream in a transport direction) by rotation of the rollers 19. The transport of the printing medium 20 is controlled by a transport control unit 9 of a control device 7 described later.

The printing apparatus 1 includes a leading end detection unit 23 that detects a leading end 20A of the printing medium 20. The leading end detection unit 23 includes, for example, a combination of an infrared light source and an infrared detector. The leading end detection unit 23 is provided upstream of the roller 19 of the printing medium 20 in the transport direction.

Figure 2:
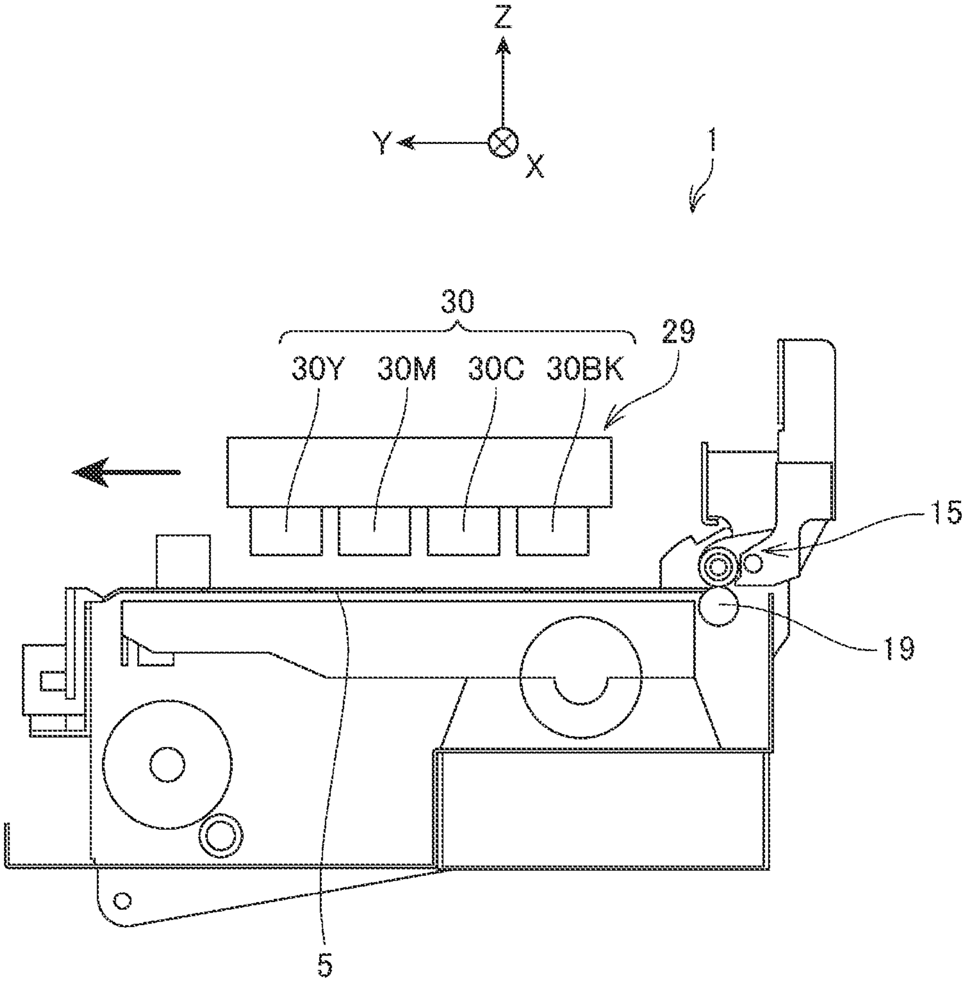
FIG. 2 is a side view of the printing apparatus.

FIG. 2 is a side view of the printing apparatus 1 according to the first embodiment. The printing medium 20 (not illustrated in FIG. 2) is transported on the support portion 5 in a direction of an arrow in FIG. 2, that is, in the positive direction of the Y-axis direction by the rotation of the roller 19 of the transport unit 15. A printing unit 29 provided directly above the support portion 5 so as to face the support portion 5 includes a plurality of line type printing heads 30. The printing unit 29 includes a line type printing head 30BK that ejects a black ink, a line type printing head 30C that ejects a cyan ink, a line type printing head 30M that ejects a magenta ink, and a line type printing head 30Y that ejects a yellow ink.

Figure 3:
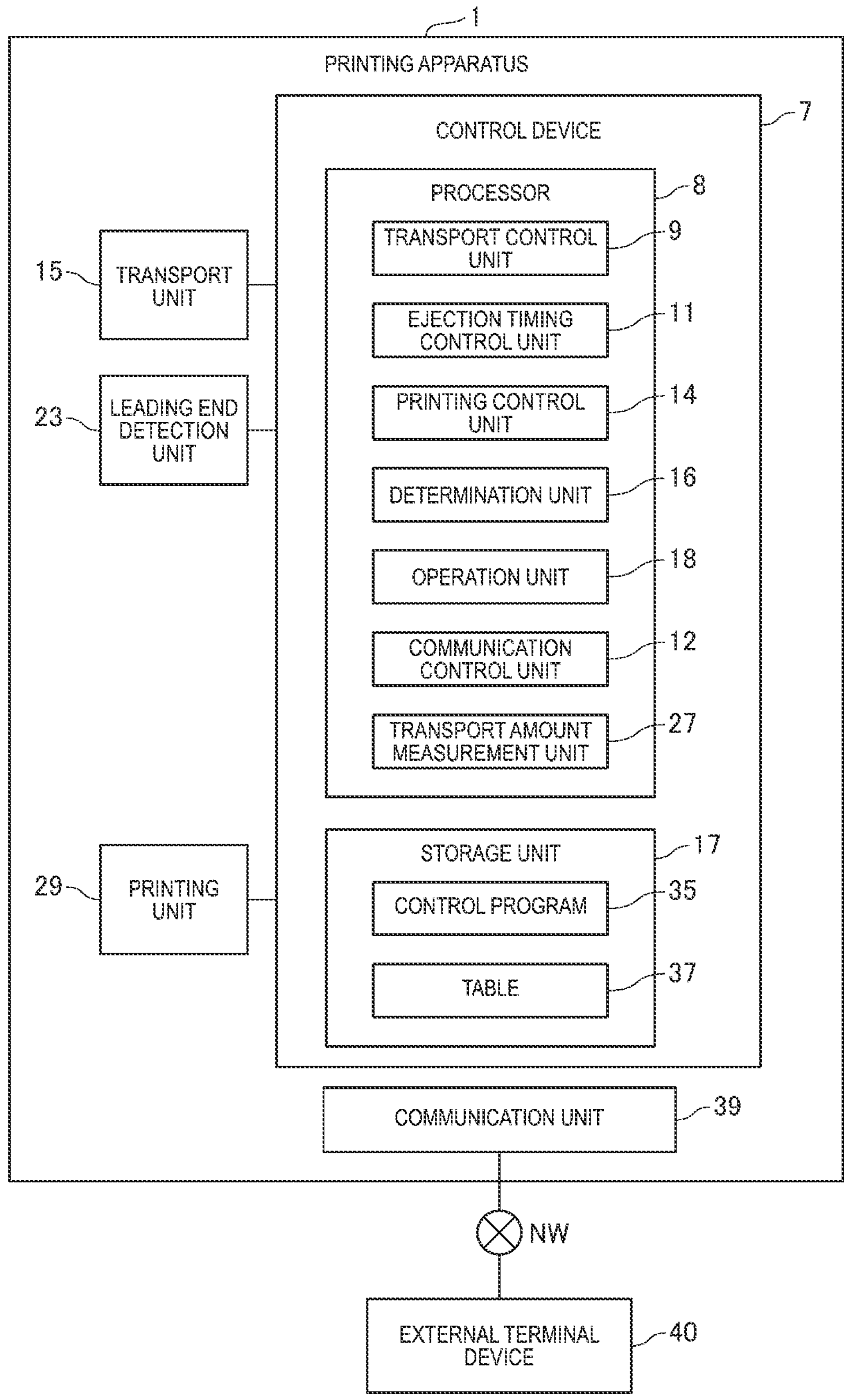
FIG. 3 is a block diagram of the printing apparatus.

FIG. 3 is a block diagram of the printing apparatus 1 according to the embodiment 1.

The printing apparatus 1 includes the control device 7 that controls various types of operation of the printing apparatus 1. The control device 7 includes a processor 8 such as a central processing unit (CPU) as will be described later.

Further, the control device 7 includes a storage unit 17 that stores data and programs as will be described later. The storage unit 17 includes a storage device such as a random access memory (RAM) or a hard disk drive (HDD).

In the printing apparatus 1, the control device 7 is coupled to the transport unit 15, the leading end detection unit 23, a transport amount measurement unit 27, and the printing unit 29. The printing apparatus 1 includes a communication unit 39 that communicates with an external device. The communication unit 39 includes an interface circuit for communication, and inputs and outputs data to and from an external terminal device 40 via a network NW, for example.

The printing apparatus 1 includes the printing unit 29. In the embodiment, as described above, the printing unit 29 includes the plurality of line type printing heads 30.

The processor 8 reads and executes a control program 35 stored in the storage unit 17, thereby functioning as the transport control unit 9, the transport amount measurement unit 27, an ejection timing control unit 11, a print control unit 14, a determination unit 16, and a communication control unit 12.

The transport control unit 9 controls the transport unit 15 to control transport of the printing medium 20.

The transport amount measurement unit 27 measures a transport amount of the printing medium 20 based on a detection result of the leading end 20A of the printing medium and how much the transport control unit 9 rotates the roller 19.

The ejection timing control unit 11 controls ejection timing at which ink is ejected from the line type printing head 30. Details of the control will be described later.

The print control unit 14 controls printing by integrally controlling the leading end detection unit 23, the transport amount measurement unit 27, and the printing unit 29.

The determination unit 16 determines which position of the support portion 5 the leading end 20A of the printing medium reaches in the transport direction of the printing medium 20, or the like, based on a detection result of the leading end detection unit 23, and the transport of the printing medium 20 by the transport control unit 9.

The communication control unit 12 controls the communication unit 39 that communicates with the external device.

The storage unit 17 stores the control program 35 that controls printing, transport, and the like, a table 37 that is a data set related to ejection timing described later, and the like.

1.2. Operation of Printing Apparatus

When the leading end 20A of the printing medium 20 is positioned downstream of the support portion 5 in the transport direction of the printing medium 20, a transport speed of the printing medium 20 is lower as compared with a case where the leading end 20A of the printing medium 20 is positioned upstream of the support unit 5. This is because the number of suction holes 10 covered by the printing medium 20 is smaller in the latter case than in the former case, and resistance force due to suction against transport force for the printing medium 20 is smaller in the latter case than in the former case. Therefore, when the leading end 20A of the printing medium 20 is positioned upstream of the support portion 5, and ink is ejected at ejection timing for the former case, a landing position of the ink is shifted from a target position.

Further, the transport speed of the printing medium 20 decreases as the leading end 20A of the printing medium 20 is positioned farther downstream in the transport direction of the printing medium 20. This is because the number of suction holes 10 covered by the printing medium 20 increases as the leading end 20A of the printing medium 20 is positioned farther downstream in the transport direction of the printing medium 20. Therefore, in a case where the leading end 20A of the printing medium 20 is positioned upstream of the support portion 5, when ejection timing is fixed timing, a landing position of the ink is shifted from the target position.

The shift of the landing position will be described in more detail with reference to FIGS. 4, 5, and 6, and the ejection timing control unit 11 will be described with reference to FIGS. 4, 5, 6, and 7.

Figure 4:
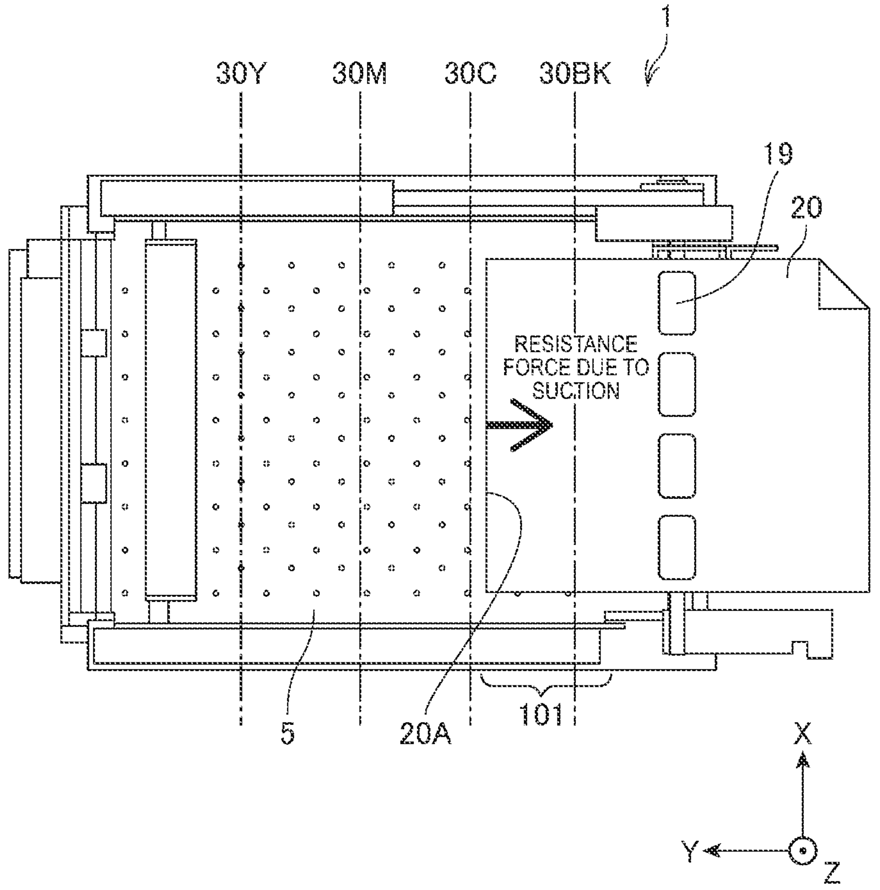
FIG. 4 is a schematic diagram illustrating a case where a leading end of the printing medium is in a first region.

FIG. 4 is a diagram illustrating a case where the leading end 20A of the printing medium is positioned between the line type printing head 30BK and the line type printing head 20C in the transport direction of the printing medium 20. FIG. 5 is a diagram illustrating a case where the leading end 20A of the printing medium is positioned between the line type printing head 30C and the line type printing head 30M in the transport direction of the printing medium 20. In comparison between FIGS. 4 and 5, resistance force due to suction against transport force of the transport unit 15 for the printing medium 20, that is, a transport load is smaller in the case of FIG. 4 than in the case of FIG. 5. Therefore, a distance by which the printing medium 20 is transported per unit time is greater in the case of FIG. 4 than in the case of FIG. 5. Therefore, when ink ejection timing is set to be the same between the case of FIG. 4 and the case of FIG. 5, a landing position of the ink is shifted from a target position in at least one of the case of FIG. 4 and the case of FIG. 5.

Figure 5:
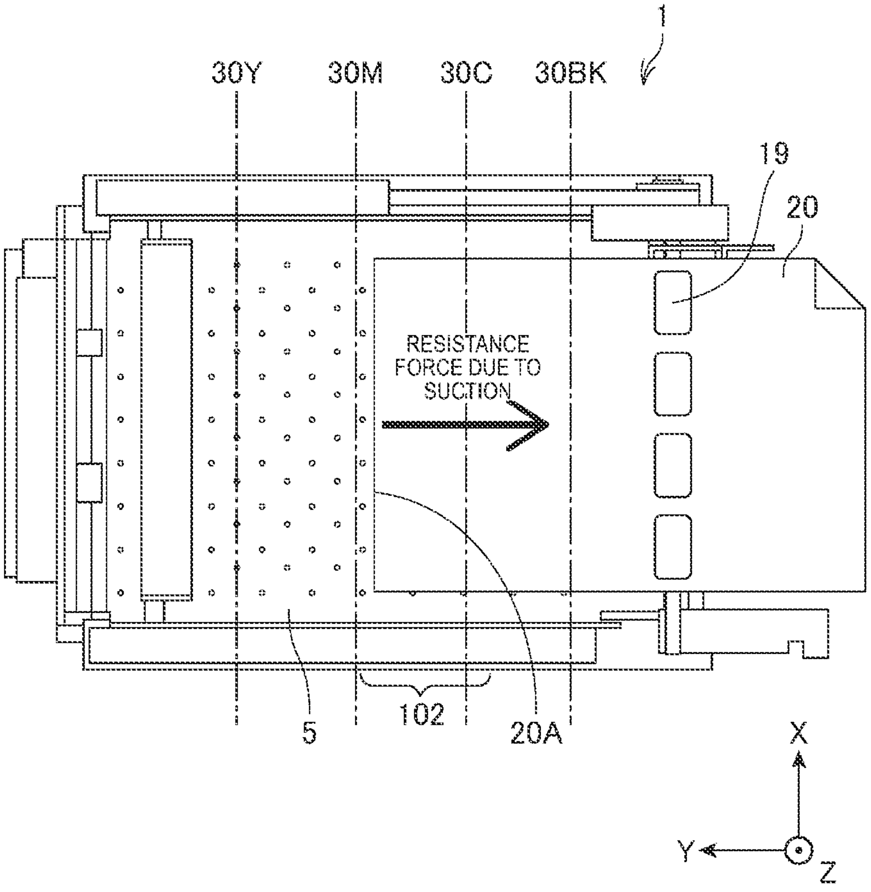
FIG. 5 is a schematic diagram illustrating a case where the leading end of the printing medium is in a second region.

In other words, when the case of FIG. 4 is compared with the case of FIG. 5, a total opening area of the plurality of suction holes 10 covered by the printing medium 20 is smaller in the case of FIG. 4 than in the case of FIG. 5. When an opening area of a plurality of the suction holes 10 to be covered is small, resistance force due to suction against transport force of the transport unit 15 is small, therefore, if ink ejection timing is fixed, an amount of shift of an ink landing position is greater in the case of FIG. 4 than in the case of FIG. 5.

Therefore, the ejection timing control unit 11 sets ejection timing of the line type printing head 30 to first ejection timing when the leading end 20A of the printing medium 20 is positioned in a first region, and sets ejection timing of the line type printing head 30 to second ejection timing when the leading end 20A of the printing medium 20 is positioned in a second region.

The first region is a region in the transport direction of the printing medium 20. For example, in FIG. 4, the first region for the line type printing head 30BK is a region indicated by a reference numeral 101.

The second region is a region in the transport direction of the printing medium 20, and is a region positioned downstream of the first region in the transport direction. For example, in FIG. 5, the second region for the line type printing head 30BK is a region indicated by a reference numeral 102.

The first ejection timing is timing faster than the second ejection timing.

For example, when the leading end 20A of the printing medium 20 is positioned in the region 101 in FIG. 4, the ejection timing control unit 11 sets ejection timing of the line type printing head 30BK to the first ejection timing, whereas when the leading end 20A of the printing medium 20 is positioned in the region 102 in FIG. 5, the ejection timing control unit 11 sets ejection timing of the line type printing heads 30BK and 30C to the second ejection timing.

Figure 6:
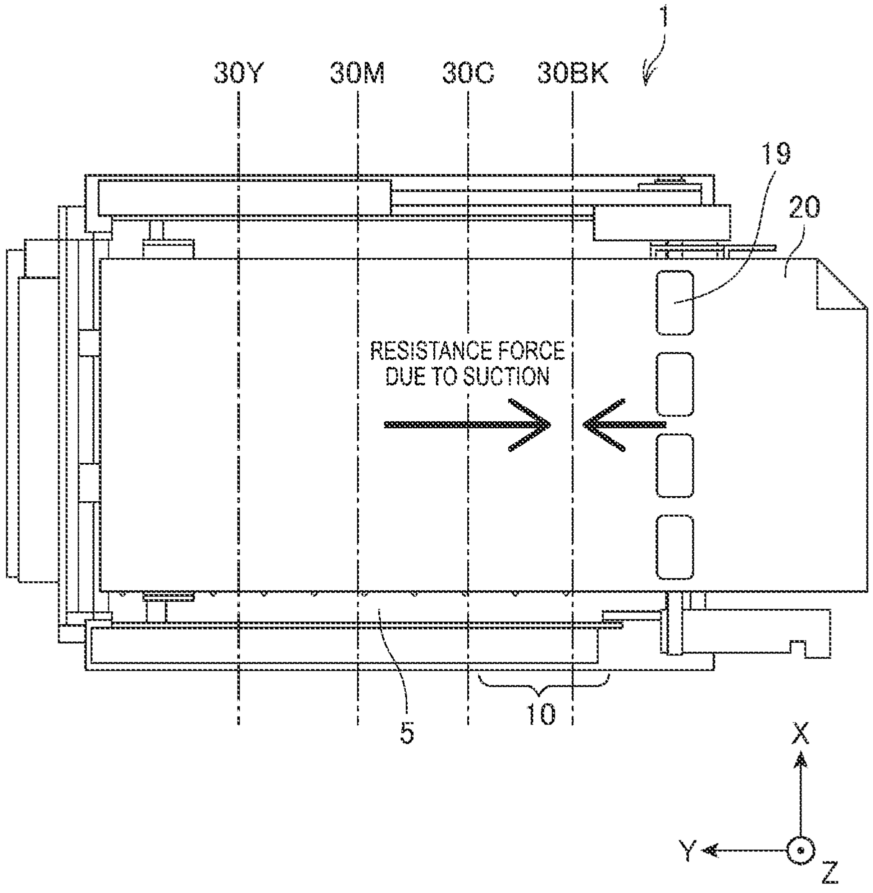
FIG. 6 is a schematic diagram illustrating a case where the leading end of the printing medium is past a support portion.

FIG. 6 is a diagram illustrating a case where the leading end 20A of the printing medium is positioned downstream of the support portion 5 in the transport direction of the printing medium 20.

In the case of FIG. 6, the number of suction holes 10 covered by the printing medium 20 does not change with transport of the printing medium 20. That is, when the leading end 20A of the printing medium 20 is past the support portion 5, a transport load does not change in subsequent transport. Therefore, after the leading end 20A is past the support portion 5, that is, after the leading end 20A is positioned downstream of the support portion 5 in the transport direction, a landing position of the ink is not shifted even when ejection timing of the ink is not changed.

Therefore, the ejection timing control unit 11 fixes ejection timing of the ink ejected from the line type printing head 30 to third ejection timing after the leading end 20A of the printing medium is past the support portion 5. The third ejection timing is timing later than the second ejection timing.

Figure 7:
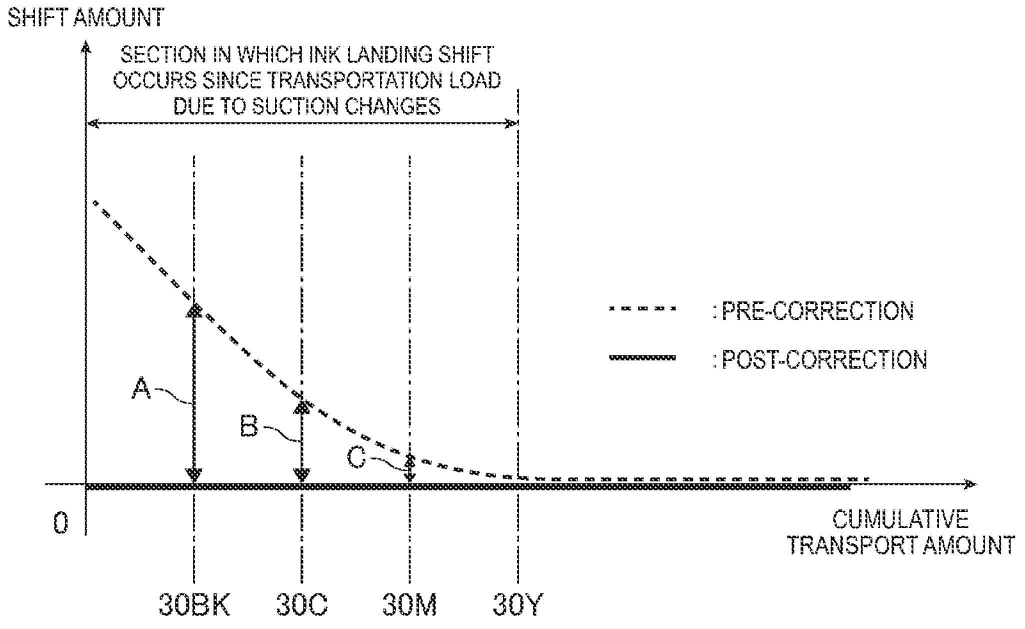
FIG. 7 is a schematic diagram showing a relationship between cumulative transport amount and ink landing shift.

The ejection timing control unit 11 controls ejection timing based on a relationship shown in FIG. 7. FIG. 7 is a graph showing a relationship between cumulative transport amount and shift of an ink landing position. A horizontal axis represents the cumulative transport amount of the printing medium 20 transported by the transport unit 15 after the leading end 20A is detected. A vertical axis represents amount of the shift of the ink landing position. As described above, a transport load changes depending on how many suction holes 10 are covered by the printing medium 20. A broken line indicates the relationship between the amount of shift of the landing position of the ink and the cumulative transport amount that occurs when the ink is ejected at the same ejection timing.

An ink landing shift amount when the leading end 20A of the printing medium is immediately below the line type printing head 30BK is defined as "A". An ink landing shift amount when the leading end 20A of the printing medium is immediately below the line type printing head 30C is defined as "B". An ink landing shift amount when the leading end 20A of the printing medium is immediately below the line type printing head 30M is defined as "C". A position of the line type printing head 30BK is upstream of a position of the line type printing head 30C with respect to the transport direction of the printing medium 20, that is, the Y-axis direction. Further, the position of the line type printing head 30C is upstream of a position of the line type printing head 30M with respect to the transport direction of the printing medium 20, that is, the Y-axis direction. Therefore, an area of the suction hole 10 covered by the printing medium 20 when the position of the leading end 20A is immediately below the line type printing head 30BK is smaller than that when the position of the leading end 20A is immediately below the line type printing head 30C. Therefore, the shift amount "A" is greater than the shift amount "B". Similarly, the shift amount "B" is greater than the shift amount "C".

The ejection timing control unit 11 controls ejection timing so that the broken line shown in FIG. 7 becomes a solid line in FIG. 7. The ejection timing control unit 11 acquires a position of the leading end 20A from the determination unit 16, determines ejection timing with reference to the acquired position and the table 37, and sets the determined ejection timing.

The table 37 is data that defines a position on an upper surface of the support portion 5 in the transport direction, and ejection timing. In the table 37, ejection timing is recorded for each position on the upper surface of the support portion 5 in the transport direction. In the table 37, ejection timing and positions with which the broken line shown in FIG. 7 can be changed to the solid line are recorded. More specifically, in the table 37, ejection timing is recorded such that timing is later at a position farther downstream in the transport direction.

The ejection timing control unit 11 controls ejection timing by outputting a signal indicating the ejection timing to the line type printing head 30. The ejection timing control unit 11 generates a reference ejection signal indicating any ejection timing of the first ejection timing, the second ejection timing, and the third ejection timing. When ink is caused to be ejected at any one of the first ejection timing, the second ejection timing, and the third ejection timing, the ejection timing control unit 11 supplies the reference ejection signal to the line type printing head 30. On the other hand, when ink is caused to be ejected at other ejection timing at which the reference ejection signal is not supplied, the ejection timing control unit 11 supplies a correction signal obtained by correcting the reference ejection signal.

In this way, the ejection timing control unit 11 corrects a shift of a landing position of the ink, by changing the ejection timing of the ink ejected from the line type printing head 30 based on the relationship shown in FIG. 7. As a result, the shift of the ink landing position after the correction is eliminated as indicated by the solid line in FIG. 7.

As shown in FIG. 7, it is desirable that the ejection timing control unit 11 changes the ejection timing in stages while the leading end 20A of the printing medium advances from the first region 101 to the second region 102 to correct the ink landing shift amount. At this time, the ejection timing control unit 11 controls the printing unit 29 based on positional information of the printing medium 20 acquired by the leading end detection unit 23 and the transport amount measurement unit 27 according to the table 37 stored in the storage unit 17, as to at what ejection timing the ink is ejected.

Figure 8:
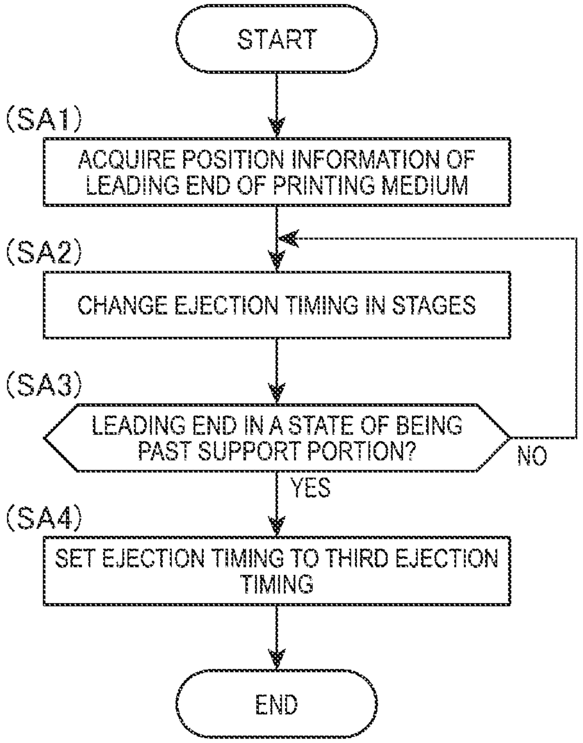
FIG. 8 is a flowchart for describing operation of the printing apparatus.

FIG. 8 is a flowchart for explaining operation of the printing apparatus 1 according to the first embodiment.

The leading end detection unit 23 detects the leading end 20A of a printing medium (step SA1). The ejection timing control unit 11 changes ejection timing in stages as the leading end 20A moves from the first region to the second region (step SA2). The determination unit 16 determines whether the leading end 20A is in a state of passing through the support portion 5 or not (step SA3). When the determination unit 16 determines that the leading end 20A is in a state of being past the support portion 5 (step SA3: YES), the ejection timing control unit 11 sets ejection timing of the line type printing head 30 to the third ejection timing (step SA4).

Returning to the description of step SA3, when the determination unit 16 determines that the leading end 20A is not in the state of being past the support portion 5 (step SA3: NO), the processor 8 performs the processing of step SA2 and the subsequent steps again.

2. Second Embodiment

Figure 9:
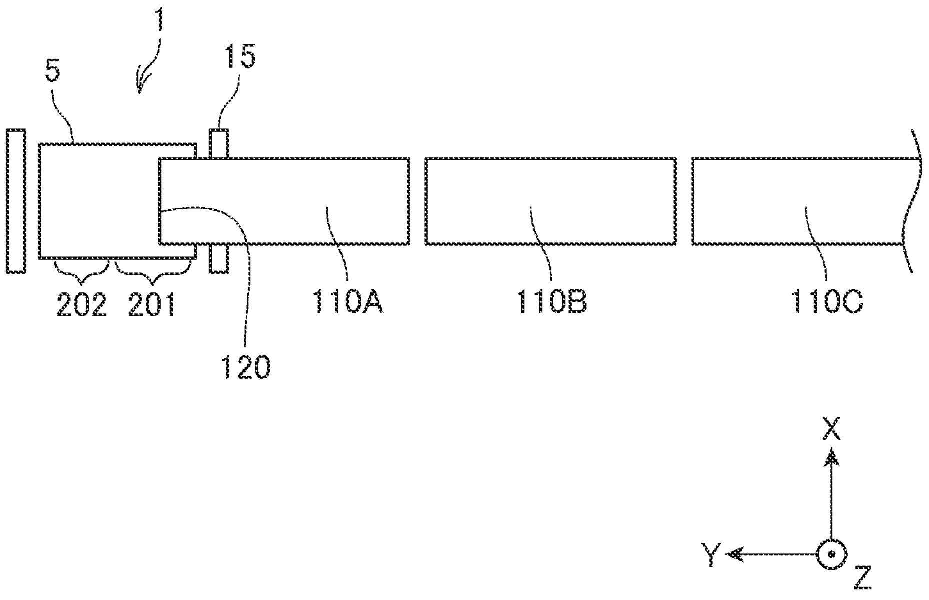
FIG. 9 is a schematic diagram when printing is continually performed on a plurality of cut sheets.
Figure 10:
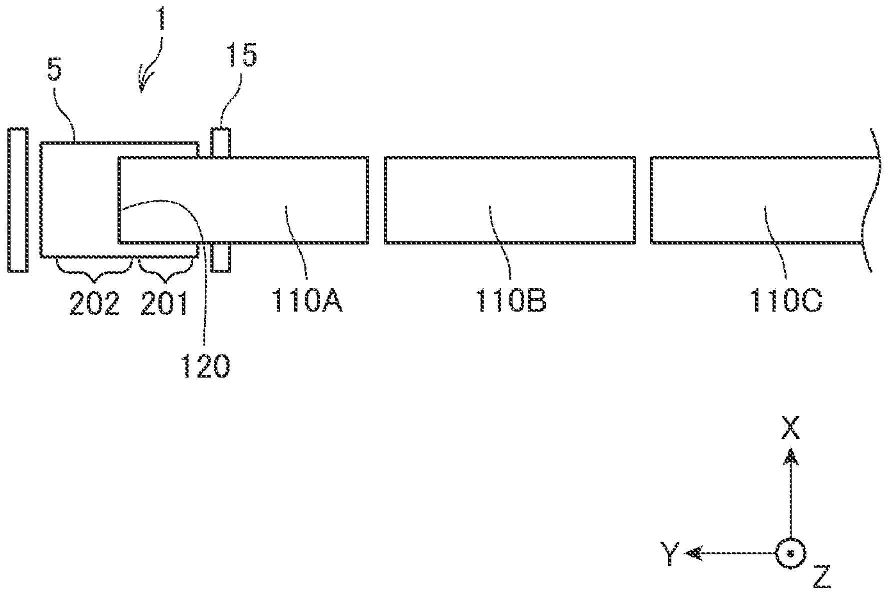
FIG. 10 is a schematic diagram when printing is continually performed on the plurality of cut sheets.
Figure 11:
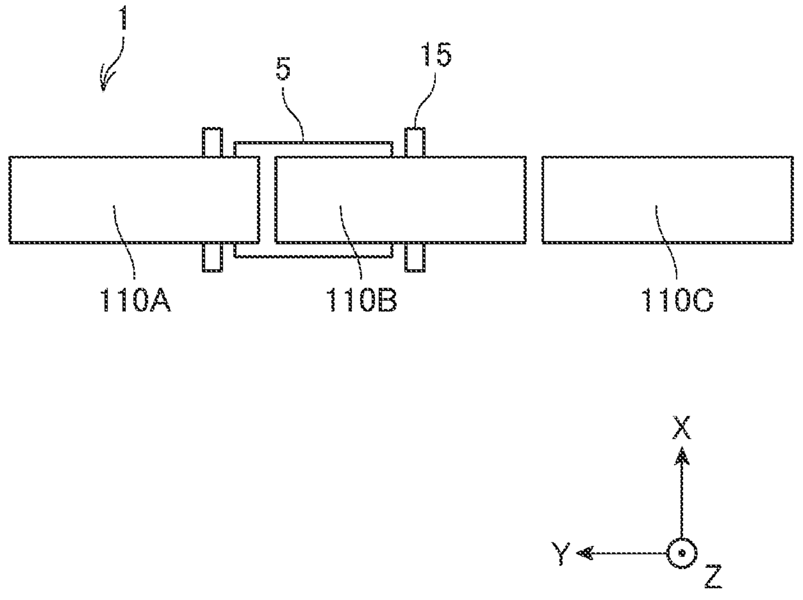
FIG. 11 is a schematic diagram when printing is continually performed on the plurality of cut sheets.

With reference to FIGS. 9, 10, and 11, the printing apparatus 1 according to a second embodiment will be described below.

2.1. Overall Configuration of Printing Apparatus

Since a configuration of the printing apparatus 1 according to the second embodiment is the same as that of the first embodiment, description thereof will be omitted. A difference between the first embodiment and the second embodiment is that the printing medium 20 which is a target of printing is a cut sheet in the second embodiment. Note that in the second embodiment, the leading end of the printing medium 20 is a leading end 120 of a cut sheet 110A on which printing is initially performed among a plurality of the cut sheets.

2.2. Operation of Printing Apparatus

FIG. 9 is a diagram illustrating a case where the leading end 120 of the printing medium is in a region 201 which is the first region. Further, FIG. 9 illustrates a case where the printing apparatus 1 continually performs printing on the plurality of cut sheets. In the case of FIG. 9, when the leading end 120 of the cut sheet 110A positioned farthest downstream in the transport direction is detected, the printing apparatus 1 performs the ejection timing control of the first embodiment.

Here, the ejection timing control unit 11 sets ejection timing of the line type printing head 30 to the first ejection timing when the leading end of the cut sheet 110A positioned farthest downstream in the transport direction is positioned in the first region of the support portion 5.

FIG. 10 is a diagram of a case where the leading end 120 of the cut sheet 110A on which printing is initially performed is in a region 202 which is the second region of the support portion 5. The ejection timing control unit 11 sets ejection timing of the line type printing head 30 to the second ejection timing when the line type printing head 30 is positioned in the second region of the support portion 5.

FIG. 11 is a diagram illustrating a state after the leading end 120 of the cut sheet 110A is past the support portion 5. The ejection timing control unit 11, for a second cut sheet 110B among the plurality of cut sheets, causes ink ejected from the line type printing head 30 to be ejected at the third ejection timing. Here, the third ejection timing is later than the second ejection timing. Also for the second and subsequent cut sheets, for example, for a cut sheet 110C and subsequent cut sheets, the ejection timing control unit 11 causes the ink ejected from the line type printing head 30 to be ejected at the third ejection timing.

The present disclosure is not limited to the above-described embodiments, and various modifications can be made without departing from the spirit and gist of the present disclosure.

The processing units in the flowchart illustrated in FIG. 8 are obtained by dividing processing in accordance with a main processing content to facilitate understanding of the processing of the control device 7, thus the present disclosure is not limited by a method for dividing the processing into the processing units and names thereof. The operation in FIG. 8 may be divided into a larger number of the units of the processing in accordance with the content of the processing, and one unit of the processing may be divided to include a larger number of processes. In addition, the order of the processing in the above-described flowchart is not limited to the illustration of the drawings.

APPENDICES

A summary of the present disclosure will be appended below.

Appendix 1

A printing apparatus including a transport unit configured to transport a printing medium, a support portion including a plurality of suction holes, and configured to support the printing medium while suctioning the printing medium via the suction hole, a line type printing head disposed at a position facing the support portion, and configured to perform printing by ejecting ink onto the printing medium supported by the support portion, and an ejection timing control unit configured to control ejection timing of the ink ejected from the line type printing head, wherein when the ejection timing when a leading end of the printing medium in a transport direction is positioned in a first region of the support portion is first ejection timing, and the ejection timing when the leading end is positioned in a second region of the support portion positioned downstream of the first region in the transport direction is second ejection timing, the ejection timing control unit controls the ejection timing such that the first ejection timing is earlier than the second ejection timing.

Accordingly, it is possible to change ejection timing of the ink in accordance with a change in a transport speed of the printing medium due to suction from the suction hole, thus it is possible to suppress a shift of a landing position of the ink.

Appendix 2

The printing apparatus according to Appendix 1, wherein the ejection timing control unit controls the ejection timing so as to be fixed to third ejection timing, when the leading end is positioned downstream of the support portion in the transport direction, and the third ejection timing is later than the second ejection timing.

Accordingly, in a state where an entire upper surface of the support portion is covered with the printing medium, a transport speed of the printing medium is decreased, and thus it is possible to maintain the ejection timing of the ink to be later in accordance with the transport speed. Therefore, printing can be performed while maintaining print quality.

Appendix 3

The printing apparatus according to Appendix 2, wherein the ejection timing control unit supplies a reference ejection signal for indicating the ejection timing to the line type printing head, and the ejection timing control unit supplies the reference ejection signal to the line type printing head at any of the first ejection timing, the second ejection timing, and the third ejection timing, and supplies a correction signal obtained by correcting the reference ejection signal at the rest of the ejection timing at which the reference ejection signal is not supplied.

Thus, once the reference ejection signal is generated, a plurality of pieces of ejection timing can be set using the reference ejection signal. Therefore, it is possible to suppress a shift of a landing position of ink while reducing a processing load.

Appendix 4

The printing apparatus according to any one of Appendices 1 to 3, wherein the ejection timing control unit changes the ejection timing in stages while the leading end advances from the first region to the second region.

According to this, the ejection timing is changed in stages, thus it is possible to reduce a processing load related to control of the ejection timing, as compared to a case where the ejection timing is linearly changed. Therefore, it is possible to suppress the shift of the landing position of the ink while reducing a processing load related to the control of the ejection timing.

Appendix 5

The printing apparatus according to any one of Appendices 1 to 4, wherein a total opening area of the suction hole covered by the printing medium when the leading end is in the first region is smaller than a total opening area of the suction hole covered by the printing medium when the leading end is in the second region.

According to this, it is possible to change ink ejection timing in accordance with a transport speed that changes between the first region in which suction force for the printing medium is small and the second region in which the suction force for the printing medium is large, thus it is possible to suppress the landing shift of the ink.

Appendix 6

The printing apparatus according to any one of Appendices 1 to 5, wherein the printing medium is a plurality of cut sheets on which printing is continually performed, the leading end is a leading end of a cut sheet on which printing is initially performed among the plurality of cut sheets, and the ejection timing control unit ejects ink at the third ejection timing onto a second cut or a sheet thereafter among the plurality of cut sheets.

According to this, even when printing is continually performed on the plurality of cut sheets, it is possible to suppress the shift of the landing position of the ink.

Appendix 7

The printing apparatus according to any one of Appendices 1 to 6 including a leading end detection unit disposed upstream of the support portion in the transport direction, and configured to detect the leading end, and a transport amount measurement unit configured to measure a transport amount of the printing medium, wherein the ejection timing control unit estimates a position of the leading end at the support portion based on a detection result of the leading end detection unit and a measurement result of the transport amount measurement unit, and controls the ejection timing in accordance with an estimated position of the leading end.

As a result, the ejection timing can be controlled in accordance with the estimated position of the leading end, thus it is possible to appropriately suppress the landing shift of the ink.

Appendix 8

The printing apparatus according to Appendix 7 including a storage unit storing a table that defines a relationship between a position of the leading end at the support portion and the ejection timing according to a position of the leading end at the support portion, wherein the ejection timing control unit determines the ejection timing based on an estimated position of the leading end at the support portion and the table.

Accordingly, since the ejection timing can be determined with reference to the table, it is possible to suppress the shift of the landing position of the ink while reducing a processing load related to the ejection timing.

Appendix 9

A printing method according to a printing apparatus including a transport unit for transporting a printing medium, a support portion including a plurality of suction holes and configured to support the printing medium while suctioning the printing medium via the suction hole, and a line type printing head disposed at a position facing the support portion for performing printing by ejecting ink onto the printing medium supported by the support portion, the printing method including a suction step for suctioning the printing medium via the suction hole, an ejection step for the line type printing head to eject ink onto the printing medium, and a timing control step for controlling ejection timing at which the ink is ejected from the line type printing head, wherein when the ejection timing when a leading end of the printing medium in a transport direction is positioned in a first region of the support portion is first ejection timing, and the ejection timing when the leading end is positioned in a second region of the support portion positioned downstream of the first region in the transport direction is second ejection timing, the timing control step controls the ejection timing such that the first ejection timing is earlier than the second ejection timing.

According to this, the same effect as that of the printing apparatus of Appendix 1 is achieved.

What is claimed is:

1. A printing apparatus, comprising:

a transport unit configured to transport a printing medium in a transport direction;

a support portion including a plurality of suction holes, and configured to support the printing medium while suctioning the printing medium via the suction hole;

a line type printing head disposed at a position facing the support portion, and configured to perform printing by ejecting ink onto the printing medium supported by the support portion, the line type printing head extending perpendicular to the transport direction so as to print without the line type printing head moving perpendicular to the transport direction; and an ejection timing control unit configured to control ejection timing of the ink ejected from the line type printing head, wherein the ejection timing when a leading end of the printing medium in the transport direction is positioned in a first region of the support portion is first ejection timing, and the ejection timing when the leading end is positioned in a second region of the support portion positioned downstream of the first region in the transport direction is second ejection timing, the ejection timing control unit controls the ejection timing such that the first ejection timing is earlier than the second ejection timing.

2. The printing apparatus according to claim 1, wherein the ejection timing control unit controls the ejection timing so as to be fixed as third ejection timing, when the leading end is positioned downstream of the support portion in the transport direction, and the third ejection timing is later than the second ejection timing.

3. The printing apparatus according to claim 2, wherein the ejection timing control unit supplies a reference ejection signal for indicating the ejection timing to the line type printing head, and the ejection timing control unit supplies the reference ejection signal to the line type printing head at any of the first ejection timing, the second ejection timing, and the third ejection timing, and supplies a correction signal obtained by correcting the reference ejection signal at the rest of the ejection timing at which the reference ejection signal is not supplied.

4. The printing apparatus according to claim 2, wherein the printing medium is a plurality of cut sheets on which printing is continually performed, the leading end is a leading end of a cut sheet on which printing is initially performed among the plurality of cut sheets, and the ejection timing control unit ejects ink at the third ejection timing onto a second cut or a sheet thereafter among the plurality of cut sheets.

5. The printing apparatus according to claim 1, wherein the ejection timing control unit changes the ejection timing in stages while the leading end advances from the first region to the second region.

6. The printing apparatus according to claim 1, wherein a total opening area of the suction hole covered by the printing medium when the leading end is in the first region is smaller than a total opening area of the suction hole covered by the printing medium when the leading end is in the second region.

7. The printing apparatus according to claim 1, comprising:

a leading end detection unit disposed upstream of the support portion in the transport direction, and configured to detect the leading end; and a transport amount measurement unit configured to measure a transport amount of the printing medium, wherein the ejection timing control unit estimates a position of the leading end at the support portion based on a detection result of the leading end detection unit and a measurement result of the transport amount measurement unit, and controls the ejection timing in accordance with an estimated position of the leading end.

8. The printing apparatus according to claim 7 comprising a storage unit storing a table that defines a relationship between a position of the leading end at the support portion and the ejection timing according to a position of the leading end at the support portion, wherein the ejection timing control unit determines the ejection timing based on an estimated position of the leading end at the support portion and the table.

9. A printing method according to a printing apparatus including a transport unit for transporting a printing medium in a transport direction, a support portion including a plurality of suction holes and configured to support the printing medium while suctioning the printing medium via the suction hole, and a line type printing head disposed at a position facing the support portion for performing printing by ejecting ink onto the printing medium supported by the support portion, the line type printing head extending perpendicular to the transport direction so as to print without the line type printing head moving perpendicular to the transport direction, the printing method comprising:

a suction step for suctioning the printing medium via the suction hole;

an ejection step for the line type printing head to eject ink onto the printing medium; and a timing control step for controlling ejection timing at which the ink is ejected from the line type printing head, wherein the ejection timing when a leading end of the printing medium in the transport direction is positioned in a first region of the support portion is first ejection timing, and the ejection timing when the leading end is positioned in a second region of the support portion positioned downstream of the first region in the transport direction is second ejection timing, the timing control step controls the ejection timing such that the first ejection timing is earlier than the second ejection timing.

* * * * *